United States Patent
Fan et al.

(10) Patent No.: US 10,080,009 B2
(45) Date of Patent: Sep. 18, 2018

(54) METHOD AND SYSTEM FOR OBTAINING IMAGES FOR 3D RECONSTRUCTION AND METHOD AND SYSTEM FOR 3D RECONSTRUCTION

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Haoqiang Fan, Beijing (CN); Qi Yin, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 217 days.

(21) Appl. No.: 15/010,683

(22) Filed: Jan. 29, 2016

(65) Prior Publication Data
US 2017/0111628 A1    Apr. 20, 2017

(30) Foreign Application Priority Data
Oct. 19, 2015    (CN) .......................... 2015 1 0680737

(51) Int. Cl.
*H04N 13/156*    (2018.01)
*H04N 13/243*    (2018.01)
(Continued)

(52) U.S. Cl.
CPC ......... *H04N 13/156* (2018.05); *H04N 5/2256* (2013.01); *H04N 5/2351* (2013.01);
(Continued)

(58) Field of Classification Search
CPC ............. H04N 13/004; H04N 13/0242; H04N 5/2256; H04N 5/23254; H04N 5/2351
See application file for complete search history.

(56) References Cited

U.S. PATENT DOCUMENTS 4,669,840 A * 6/1987 Samuelson .......... G03B 7/0807
352/141
5,818,959 A * 10/1998 Webb ................. H04N 13/0239
348/47
(Continued)

*Primary Examiner* — Peter D Le
(74) *Attorney, Agent, or Firm* — Hamre, Schumann, Mueller & Larson, P.C.

(57) ABSTRACT

A method for obtaining images for three dimension (3D) reconstruction comprises: controlling brightness of each of at least two light sources which are spatially separated from each other to be changed periodically, wherein, among the at least two light sources, there is at least one light source having a period of brightness change different from those of the other light source(s), or the periods of the brightness change of the at least two light sources are the same, but among the at least two light sources, there is at least one light source having a phase of the brightness change different from those of the other light source(s); and using at least three cameras having different spatial positions to capture the images for the 3D reconstruction, respectively, wherein, among the at least three cameras, there is at least one camera starting exposure at a different time from the other cameras.

10 Claims, 4 Drawing Sheets

(51) Int. Cl.
    *H04N 5/225* (2006.01)
    *H04N 5/235* (2006.01)
    *H04N 13/00* (2018.01)
    *H04N 13/02* (2006.01)
    *H04N 5/232* (2006.01)

(52) U.S. Cl.
    CPC ....... *H04N 5/23254* (2013.01); *H04N 13/004* (2013.01); *H04N 13/0242* (2013.01); *H04N 13/243* (2018.05)

(56) References Cited

U.S. PATENT DOCUMENTS

| | | | | |
|---|---|---|---|---|
| 6,587,183 B1* | 7/2003 | Uomori | .................. | G01B 11/25 348/E5.058 |
| 2010/0231692 A1* | 9/2010 | Perlman | .................. | G06F 3/005 348/48 |
| 2012/0168507 A1* | 7/2012 | Jovanovski | ........ | G06K 7/10752 235/455 |
| 2013/0182902 A1* | 7/2013 | Holz | .................... | G06K 9/3233 382/103 |
| 2016/0269656 A1* | 9/2016 | Tao | ....................... | H04N 5/3532 |
| 2017/0163862 A1* | 6/2017 | Molina | ................ | H04N 5/2258 |

* cited by examiner

METHOD AND SYSTEM FOR OBTAINING IMAGES FOR 3D RECONSTRUCTION AND METHOD AND SYSTEM FOR 3D RECONSTRUCTION

CROSS-REFERENCE TO RELATED APPLICATION

The present disclosure claims the benefits of and priority of Chinese patent application No. 201510680737.7 filed on Oct. 19, 2015, the disclosure of which is incorporated herein by reference in its entirety.

TECHNICAL FIELD OF THE DISCLOSURE

The present disclosure relates to stereo imaging, and particularly to method and system for obtaining images for three dimension (3D) reconstruction and method and system for 3D reconstruction.

BACKGROUND

Multi-view stereo imaging refers to obtaining, generating and transmitting a scene based on primary principle of multi-view stereo vision and presenting the scene with stereoscopic vision. Multi-view stereo imaging is widely used in the fields of virtual reality, machine vision, multi-media teaching, digital entertainment, product appearance design, carving and architecture or the like. The primary process of multi-view stereo imaging is to capture images of a same object by multiple cameras at different positions at the same time, match the pixels in the obtained multiple images, and finally obtain the depth information (i.e., 3D coordinates) of the individual pixels based on, for example, triangulation principle, thereby obtaining a 3D stereo image.

FIG. 1 exemplarily explains the triangulation principle. As shown in FIG. 1, two cameras at different positions capture images of a same object, respectively. Thereafter, with respect to a point seen from one camera (i.e., a pixel in the image captured by the camera), a corresponding point seen from the other camera (i.e., a matching pixel in the image captured by the other camera) is found. An intersection point of extending lines of two lines respectively connecting the two points and their respective cameras (simply referred to as 3D radial lines) is derived, and thus the coordinates of the point to be measured can be obtained. Similarly, when capturing by three or more cameras, with respect to a point seen from one camera, corresponding points seen from other cameras can be found, respectively, and the intersection points between each two of the 3D radial lines are derived, thereby obtaining the coordinates of the point to be measured.

An important problem with the multi-view stereo imaging is non-diffuse reflection phenomenon, which is also called specular highlight phenomenon. When there is specular highlight on the surface of the object, since the object image of the specular highlight region is affected by normal direction of the object surface and positions of the light source and cameras, a systematic offset may be arisen in pixel matching, which causes the shape information of the captured object to be distorted. Such a problem is especially serious in the case that the specular highlight occurs in protuberant positions of the object surface.

FIG. 2 is a schematic view showing the distortion phenomenon occurred in the shape information of the captured object due to the specular highlight. As shown in FIG. 2, it is assumed that with respect to one pixel located at the protrusion of the object in the image captured by camera 1, it is attempted to find matching pixels in the images captured by cameras 2 and 3, respectively. Since the normal direction on the surface of the protrusion of the object monotonously changes rapidly, due to the interference of the specular highlight, the position of the matching pixel found in the image captured by camera 2 shifts to the right with respect to the actual correct position, and the position of the matching pixel found in the image captured by camera 3 shifts to the right even further with respect to the actual correct position. When the degrees of shifting to right for the matching pixels found for cameras 2 and 3 are just fit, it is possible that the 3D radial lines corresponding to respective cameras just intersect at a same point (3D point) during the triangulation, which may lead to an misunderstanding of finding a reconstruction 3D point. Actually, however, the position of this 3D point is behind the actual protrusion position, rendering the place that should have been convex becomes concave in the output reconstruction result.

With respect to the specular highlight problem as described above, researches have been made in the art, and hardware alter-based or software process-based methods have been proposed. The hardware alter-based method, for example, is to add a polarization plate before the camera and the light source, which increases the hardware complexity of the system and reduces the efficiency of the light source. The software process-based method, for example, is to determine whether the grey level value of the pixels are too bright, however, it is not robust enough and can not deal with the situation where the specular highlight generated by the skin or the like is not that bright, for example.

SUMMARY

The present disclosure is proposed in view of the above problems.

According to an aspect of the present disclosure, there is provided a method for obtaining images for three dimension (3D) reconstruction comprising: controlling brightness of each of at least two light sources which are spatially separated from each other to be changed periodically, wherein, among the at least two light sources, there is at least one light source having a period of brightness change different from those of the other light source(s), or the periods of the brightness change of the at least two light sources are the same, but among the at least two light sources, there is at least one light source having a phase of the brightness change different from those of the other light source(s); and using at least three cameras having different spatial positions to capture the images for the 3D reconstruction, respectively, wherein, among the at least three cameras, there is at least one camera starting exposure at a different time from the other cameras.

According to anther aspect of the present disclosure, there is provided a method for three dimension (3D) reconstruction comprising: controlling brightness of each of at least two light sources which are spatially separated from each other to be changed periodically, wherein, among the at least two light sources, there is at least one light source having a period of brightness change different from those of the other light source(s), or the periods of the brightness change of the at least two light sources are the same, but among the at least two light sources, there is at least one light source having a phase of the brightness change different from those of the other light source(s); using at least three cameras having different spatial positions to capture the images for the 3D reconstruction, respectively, wherein, among the at least three cameras, there is at least one camera starting exposure at a different time from other cameras; using an image captured by any of the cameras as a reference image, and with respect to any pixel in the reference image, determining a candidate reconstruction point by using the pixel and a matching pixel in each of images captured by each of the other cameras, respectively; and constructing a 3D reconstruction point based on respective candidate reconstruction points if the respective candidate reconstruction points are within a predetermined range, otherwise not constructing the reconstruction point.

According to anther aspect of the present disclosure, there is provided a system for obtaining images for three dimension (3D) reconstruction comprising: at least two light sources spatially separated from each other, wherein the brightness of each of the light sources changes periodically; and at least three cameras having different spatial positions, for capturing the images for the 3D reconstruction, respectively. Among the at least two light sources, there is at least one light source having a period of brightness change different from those of the other light source(s), or the periods of the brightness change of the at least two light sources are the same, but among the at least two light sources, there is at least one light source having a phase of the brightness change different from those of the other light source(s). Among the at least three cameras, there is at least one camera starting exposure at a different time from the other cameras.

According to anther aspect of the present disclosure, there is provided a system for three dimension (3D) reconstruction comprising: at least two light sources spatially separated from each other, wherein brightness of each of the light sources is changed periodically; at least three cameras having different spatial positions, for capturing the images for the 3D reconstruction, respectively; and an image processing device, configured to use an image captured by any of the cameras as a reference image, and with respect to any pixel in the reference image, determine a candidate reconstruction point by using the pixel and a matching pixel in each of images captured by each of the other cameras, respectively, and construct a 3D reconstruction point based on respective candidate reconstruction points if the respective candidate reconstruction points are within a predetermined range, otherwise not construct the reconstruction point. Among the at least two light sources, there is at least one light source having a period of brightness change different from those of the other light source(s), or the periods of the brightness change of the at least two light sources are the same, but among the at least two light sources, there is at least one light source having a phase of the brightness change different from those of the other light source(s). Among the at least three cameras, there is at least one camera starting exposure at a different time from the other cameras.

According to the method and device for obtaining images for three dimension (3D) reconstruction and method and device for 3D reconstruction, the regions in the image affected by the specular highlight can be identified effectively by controlling the brightness change of the light sources and the time of starting exposure of the cameras, thereby false 3D points caused by pixel matching offset due to the specular highlight interference can be excluded and errors in the 3D reconstruction can be reduced effectively.

BRIEF DESCRIPTION OF THE DRAWINGS

Through the more detailed description of embodiments of the present disclosure with reference to the accompanying drawings, the above and other objects, features and advantages of the present disclosure will become more apparent. The drawings provide further understanding of the embodiments of the present disclosure, constitute part of the specification, explain the present disclosure together with the embodiments of the present disclosure and do not limit the present disclosure. In the drawings, the same reference signs generally refer to the same components or steps in the embodiments of the present disclosure.

DETAILED DESCRIPTION

In order to make the purpose, technical solution and advantage of the present disclosure obvious, a detailed description of the embodiments of the present disclosure will be given below with reference to the drawings of the embodiments. Obviously, the embodiments described herein are only part of, but not all of, the embodiments of the present disclosure. It is understood that the present disclosure should not be restricted by the exemplary embodiments described here. All the other embodiments which are made by those skilled in the art based on the embodiments of the present disclosure without any creative effort should fall into the protection range of the present disclosure.

Firstly, a method for obtaining images for 3D reconstruction according to an embodiment of the present disclosure is described with reference to FIG. 3. At least two light sources and at least three cameras are needed in this method.

Figure 3:
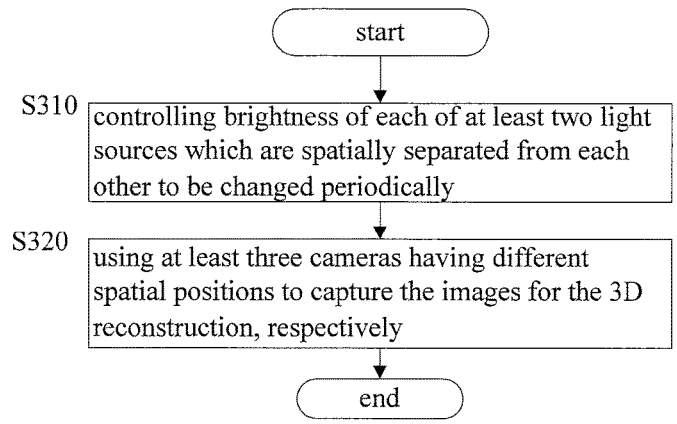
FIG. 3 is a flow chart of a method for obtaining images for 3D reconstruction according to an embodiment of the present disclosure.

As shown in FIG. 3, at step S310, brightness of each of the at least two light sources which are spatially separated from each other is controlled to be changed periodically.

The brightness of the light sources is controlled in this step. In specific, the brightness of the light sources is controlled such that among the at least two light sources, there is at least one light source which has a period of brightness change different from those of the other light source(s), or the periods of the brightness change of the at least two light sources are the same, but among the at least two light sources, there is at least one light source which has a phase of the brightness change different from those of the other light source(s).

For example, it is assumed that there are m light sources (m≥2), then the brightness of the m light sources are controlled to be changed periodically. The respective periods of brightness change of the m light sources can be arbitrarily set based on specific condition, as long as the periods of the brightness change of the m light sources are not all the same (i.e., the period of the brightness change for at least one light source is different from those of the other light sources), or the periods of the brightness change of the m light sources are all the same but the phases of the brightness change of m light sources are not all the same (i.e., the phase of the brightness change for at least one light source is different from those of the other light sources).

In one embodiment, the periods of the brightness change of the m light sources can be controlled to be comparable to the exposure time of the at least three cameras used for capturing images. For example, the periods of the brightness change of the m light sources can be controlled to be of the same order of magnitude as the exposure time of the respective cameras. For example, the periods of the brightness change of the m light sources and the exposure time of the cameras can be controlled such that the exposure time of each of the at least three cameras is greater than half of the largest period among the periods of the brightness change of the m light sources and less than twice of the smallest period among the periods of the brightness change of the m light sources.

In addition, there is no particular requirement for physical positions of the m light sources in the present embodiment as long as they are spatially separated from each other.

At step S320, at least three cameras at different spatial positions are used to capture images for 3D reconstruction, respectively.

Different from a conventional manner of capturing images by multi-view camera, in this step, among the at least three cameras, there is at least one camera that starts exposure at a different time from the other cameras. For example, it is assumed that there are n cameras (n≥3), then not all of the n cameras capture images at the same time, instead, at least one camera of the n cameras starts exposure at a different time from the others.

In one embodiment, the camera starting exposure at a different time from the others starts exposure at a predetermined delay time after the other cameras start exposure. For example, it is assumed that camera i (1≤i≤n) starts exposure at a different time from the other cameras, and the other (n−1) cameras start exposure at time $t_0$, then the camera i starts exposure at a time $t_1$, wherein $t_1=t_0+\Delta t$, and wherein $\Delta t$ is the predetermined delay time. In one embodiment, the predetermined delay time is less than the largest period among the periods of the brightness change of the m light sources.

The method for obtaining images for 3D reconstruction according to the embodiment of the present disclosure has been described above. According to this method, by controlling the brightness change of the light sources and the time of starting exposure of the cameras, the respective cameras may be mainly affected by different light sources when capturing images, and thus the positions of the specular highlight regions seen from respective cameras trend to be not caused by the same light source. Therefore, even if the positions of the matching pixels found in pixel matching with respect to the respective cameras deviate from the actual correct position due to the affect by the specular highlight, it is not likely that a 3D reconstruction point is misunderstood to be found due to the degrees of deviation are just fit, and thereby reducing errors in 3D reconstruction. In addition, it can be understood that in the above method, during each time of capturing images, each of the cameras needs to capture an image. In one embodiment, during each time of capturing images, each camera captures only one image, and thus the time required for capturing images is relatively short.

In order to enable those skilled in the art to better understand the method for obtaining images for 3D reconstruction according to the present embodiment as described above, the method will be described below with reference to FIG. 4 by using a specific but non-limited example.

Figure 4:
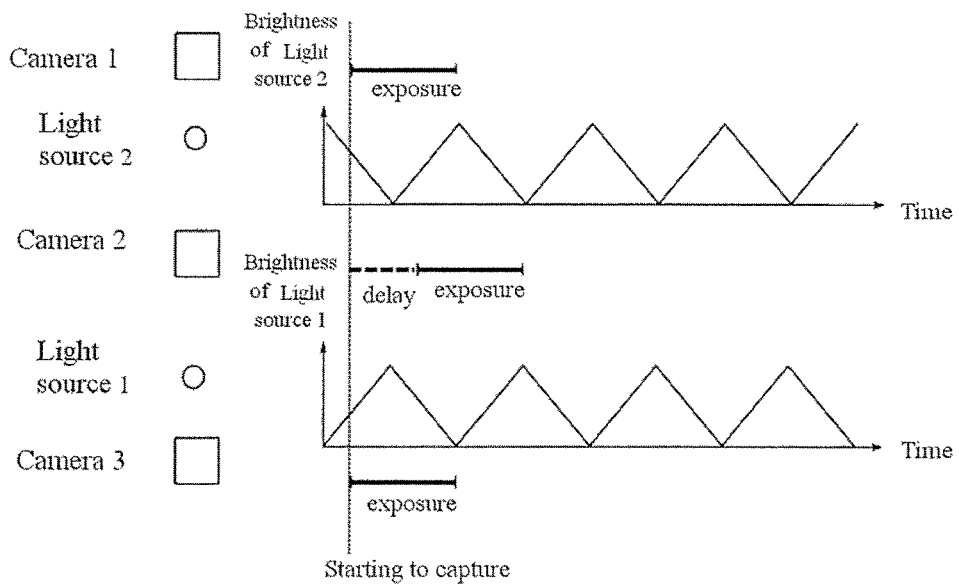
FIG. 4 shows a specific example illustrating the method for obtaining images for 3D reconstruction according to an embodiment of the present disclosure.

FIG. 4 shows a specific example illustrating the method for obtaining images for 3D reconstruction according to the present embodiment. As shown in FIG. 4, two light sources and three cameras are employed in this specific example, and the light sources and the cameras are arranged side by side. Of course, such an arrangement of the light sources and the cameras is only an example and other arrangements can be used by those skilled in the art depending on particular situations, as long as the light sources are separated spatially.

In this example, the brightness of light sources 1 and 2 changes periodically according to, for example, triangle wave, the periods of brightness change of light sources 1 and 2 are the same but the phases thereof differ by half of a period. It can be understood that it is only an example that the phase of the brightness change of light source 1 differs from that of light source 2 by half of a period, and the difference between the phases for light sources 1 and 2 can be other angles. In addition, although it is shown in FIG. 4 that the maximum value of the brightness change of light source 1 is the same as that of light source 2, it is not necessary and not restricted in the present disclosure.

In another aspect, as shown in FIG. 4, in this example, it is assumed that cameras 1 and 3 perform capturing images at the same time, and camera 2 starts the exposure at a delay time after cameras 1 and 3 start exposure. In addition, as an example, FIG. 4 shows that the exposure times of cameras 1-3 are the same, but it is not necessary and not restricted in the present disclosure.

Figure 1:
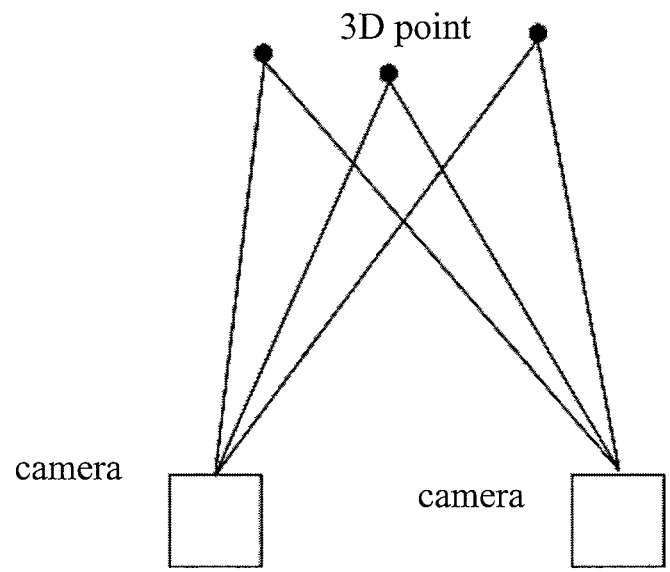
FIG. 1 exemplarily explains the triangulation principle.
Figure 2:
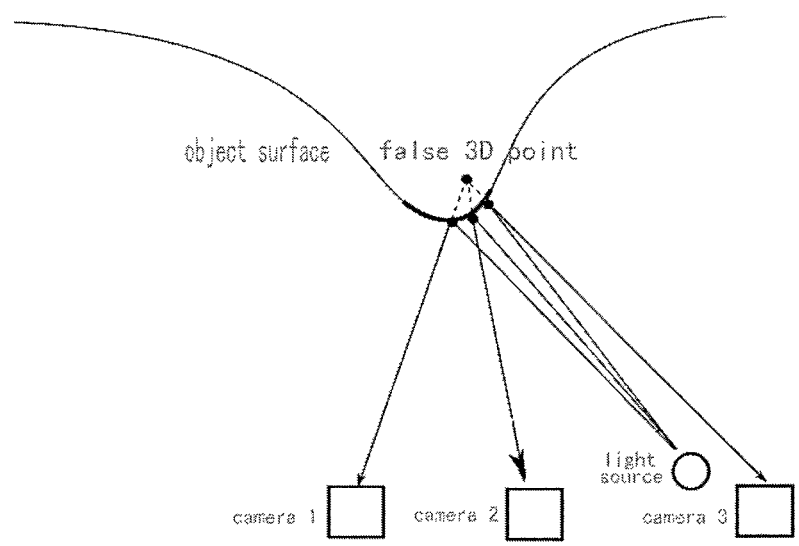
FIG. 2 is schematic view showing the distortion phenomenon occurred in the shape information of the captured object due to the specular highlight.

In the example shown in FIG. 4, since the brightness of light source 1 is higher and the brightness of light source 2 is lower during the exposure period of cameras 1 and 3, cameras 1 and 3 are affected more by light source 1, and thus the specular highlight positions seen from cameras 1 and 3 trend to be caused by light source 1. By contrast, since the brightness of light source 2 is higher and the brightness of light source 1 is lower during the exposure period of camera 2, camera 2 is affected more by light source 2, and thus the specular highlight position seen from camera 2 trends to be caused by light source 2. In this case, with respect to the object shape shown in FIG. 2, the specular highlight position seen from camera 2 is offset to the left as compared with the actual position, and the specular highlight position seen from camera 3 is offset to the right as compared with the actual position. Therefore, the 3D radial lines corresponding to the respective cameras cannot just intersect at a same point in the triangulation, thereby avoiding the situation in which a 3D point for reconstruction is found by mistake.

Figure 5:
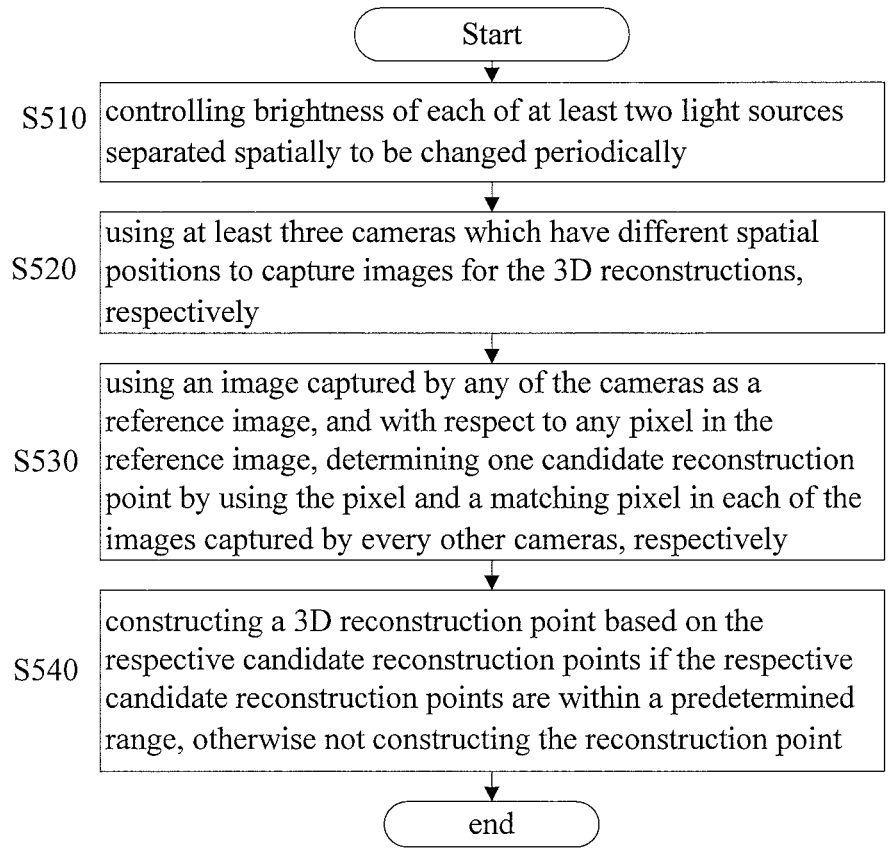
FIG. 5 is a flow chart of a method for 3D reconstruction according to an embodiment of the present disclosure.

The method for obtaining images for 3D reconstruction according to the present embodiment has been described above. The 3D reconstruction using this method will be described below. FIG. 5 is a flow chart illustrating the method for 3D reconstruction according to an embodiment of the present disclosure.

As shown in FIG. 5, at step S510, the brightness of each of the at least two light sources separated spatially is controlled to be changed periodically, wherein, among the at least two light sources, there is at least one light source having a period of brightness change different from those of other light sources, or the periods of the brightness change of the at least two light sources are the same, but among the at least two light sources, there is at least one having a phase of the brightness change different from those of other light source(s). At step S520, at least three cameras which have different spatial positions are used to capture images for 3D reconstructions, respectively, wherein, among the at least three cameras, there is at least one camera starting exposure at a different time from other cameras. The specific processes of steps S510 and S520 are the same as those of steps S310 and S320 as shown in FIG. 3, respectively, and the details are omitted.

At step S530, an image captured by any of the cameras is used as a reference image, and with respect to any pixel in this reference image, a candidate reconstruction point is determined by using this pixel and a matching pixel in each of images captured by each of the other cameras, respectively.

It is assumed that there are n cameras (n≥3), and an image captured by camera j (1≤j≤n) is used as the reference image, then the candidate reconstruction point is selected for each of the pixels in this reference image according to the process of this step. In specific, with respect to any pixel P in this reference image, a matching pixel is found in each of the images captured by each of the other (n−1) cameras, respectively, by using, for example, a feature matching method or the like, and a candidate reconstruction point is determined through the triangulation using the matching pixels and the pixel P, and thus (n−1) candidate reconstruction points can be obtained for n cameras. The process of finding matching pixels, determining candidate reconstruction points through the triangulation or the like as described above are the common processes in the art and thus the details thereof are omitted herein.

At step S540, a 3D reconstruction point is constructed based on respective candidate reconstruction points if the respective candidate reconstruction points are within predetermined range, otherwise the reconstruction point is not constructed.

As described above, (n−1) candidate reconstruction points are determined for the n cameras through step S530. If the distances among these (n−1) candidate reconstruction points are relatively short, for example, within a predetermined range, it can be considered that the (n−1) candidate reconstruction points as determined are correct and point to the same 3D reconstruction point in the space. In this case, the 3D reconstruction point corresponding to pixel P can be constructed based on the (n−1) candidate reconstruction points by employing various common processing methods in the art, such as least square method. The size of the predetermined range represents a tolerance degree to the matching error and can be set depending on particular demands.

By contrast, if the (n−1) candidate reconstruction points conflict with each other, that is, if the distances among these (n−1) candidate reconstruction points are too long, for example, go beyond the predetermined range, the (n−1) candidate reconstruction points as determined are considered to be affected by the specular highlight and are not correct, and thus the correct 3D reconstruction point can not be constructed. In this case, the (n−1) candidate reconstruction points will not be used to construct the 3D reconstruction point corresponding to pixel P, but are discarded instead.

The method for 3D reconstruction according to the present embodiment has been described above. In this method, by controlling the brightness change of the light sources and the time for starting exposure of the cameras, the regions in the image affected by the specular highlight can be identified effectively, thereby false 3D points caused by the pixel matching offset due to the interference of the specular highlight can be excluded and errors in the 3D reconstruction can be reduced effectively.

A system for obtaining images for 3D reconstruction according to an embodiment of the present disclosure will be described below with reference to FIG. 6.

Figure 6:
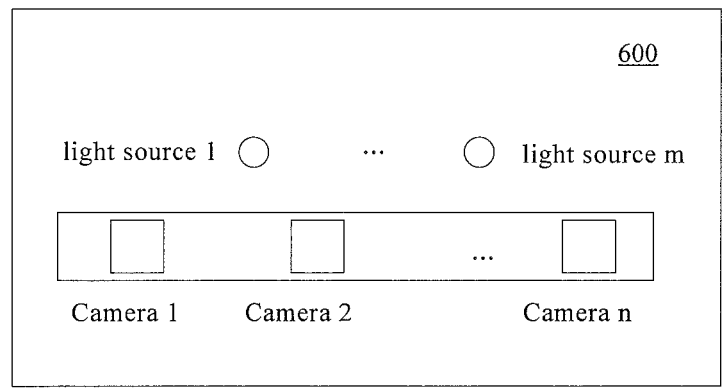
FIG. 6 is a schematic block diagram showing a system for obtaining images for 3D reconstruction according to an embodiment of the present disclosure.

As shown in FIG. 6, the obtaining system 600 includes m (m≥2) light sources spatially separated and n (n≥3) cameras having different spatial positions.

The brightness of each of the m light sources changes periodically, and among the m light sources, there is at least one having a period of brightness change different from those of the other light sources, or the periods of the brightness change of the m light sources are the same, but among the m light sources, there is at least one light source having a phase of the brightness change different from those of the others.

The respective periods of brightness change of the m light sources can be arbitrarily set based on specific condition, as long as the periods of the brightness change of the m light sources are not all the same (i.e., the period of the brightness change for at least one light source is different from those of the other light sources), or the periods of the brightness change of the m light sources are all the same but the phases of the brightness change of m light sources are not all the same (i.e., the phase of the brightness change for at least one light source is different from those of the other light sources).

Optionally, the periods of the brightness change of the m sources are comparable to the exposure time of the n cameras. For example, the periods of the brightness change of the m light sources are of the same order of magnitude as the exposure times of the respective cameras. As another example, the periods of the brightness change of the m light sources and the exposure time of the cameras can be set such that the exposure times of the n cameras are all greater than a half of the largest period among the periods of the brightness change for the m light sources and less than twice of the smallest period among the periods of the brightness change of the m light sources.

In addition, there is no particular requirement for the physical positions of the m light sources in the present embodiment as long as they are separated spatially.

The n cameras at different spatial positions capture images for 3D reconstruction, respectively. Different from a common manner of capturing images by multi-view camera, the n cameras do not capture images at the same time, and there is at least one camera that starts exposure at a different time from the other cameras.

Optionally, the camera starting exposure at a predetermined delay time after the others start exposure. For example, it is assumed that camera i (1≤i≤n) starts exposure at a different time from the other cameras, and if the other (n−1) cameras start exposure at time $t_0$, then the camera i starts exposure at a time $t_1$, wherein $t_1=t_0+\Delta t$, and wherein $\Delta t$ is the predetermined delay time. Optionally, the predetermined delay time is less than the largest period among the periods of the brightness change of the m light sources.

In the system as described above, by controlling the brightness change of the light sources and the time of starting exposure of the cameras, the respective cameras may be mainly affected by different light sources when capturing images, and thus the positions of the specular highlight regions seen from respective cameras trend to be not caused by the same light source. Therefore, even if the positions of the matching pixels found in pixel matching with respect to the respective cameras deviate from the actual correct position due to the affect by the specular highlight, it is not likely that a 3D reconstruction point is misunderstood to be found due to the degrees of deviation are just fit, and thereby reducing errors in 3D reconstruction. In addition, it can be understood that in the above system, during each time of capturing images, each of the cameras need to capture an image. In one embodiment, during each time of capturing images, each camera captures only one image, and thus the time required for capturing images is relatively short.

Figure 7:
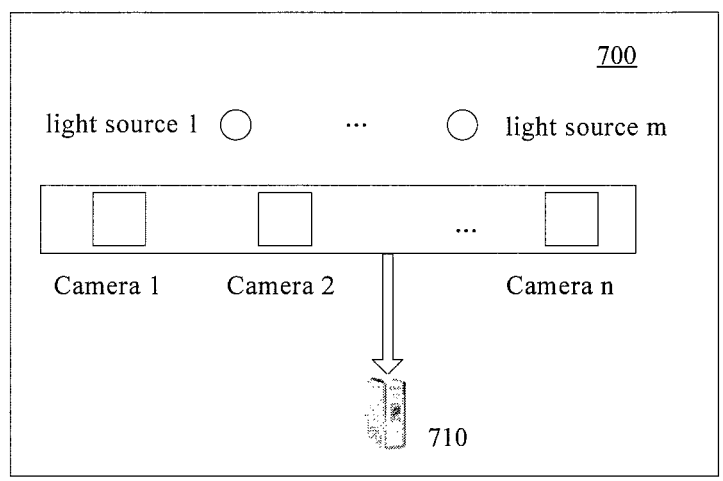
FIG. 7 is a schematic structural block diagram showing a 3D reconstruction system according to an embodiment of the present disclosure.

The system for obtaining images for 3D reconstruction according to the embodiment of the present disclosure has been described above. A 3D reconstruction system applying this system will be described below with reference to FIG. 7. FIG. 7 is a schematic structural block diagram showing a 3D reconstruction system according to an embodiment of the present disclosure.

As shown in FIG. 7, the 3D reconstruction system 700 includes m (m≥2) light sources spatially separated, n≥3 cameras having different spatial positions and an image processing device 710.

The brightness of each of the m light sources changes periodically, and among the m light sources, there is at least one having a period of brightness change different from those of the other light sources, or the periods of the brightness change of the m light sources are the same, but, among the m light sources, there is at least one having a phase of the brightness change different from those of the others.

The n cameras at different spatial positions capture images for 3D reconstruction, respectively. Different from a common manner of capturing images by multi-view camera, the n cameras do not capture images at the same time, and there is at least one camera that starts exposure at a different time from the other cameras.

The particular structures and functions of the m light sources spatially separated and n cameras having different spatial positions are the same as those of the m light sources and n cameras in FIG. 6 as described above, respectively, and thus the details thereof are omitted herein.

The image processing device 710 uses an image captured by any of the cameras as a reference image, and with respect to any pixel in this reference image, determines a candidate reconstruction point by using this pixel and a matching pixel in each of the images captured by each of the other cameras, respectively. The image processing device 710 constructs a 3D reconstruction point based on the respective candidate reconstruction points if the respective candidate reconstruction points are within a predetermined range, otherwise the image processing device 710 does not constructs the 3D reconstruction point.

It is assumed that an image captured by camera j ($1 \leq j \leq n$) is used as the reference image, then the image processing device 710 selects the candidate reconstruction point for each of the pixels in this reference image in the way as described above. In specific, with respect to any pixel P in this reference image, the image processing device 710 finds a matching pixel in each of the images captured by each of the other (n−1) cameras, respectively, by, for example, a feature matching method or the like, and determines a candidate reconstruction point through the triangulation using this matching pixel and the pixel P, and thus (n−1) candidate reconstruction points can be obtained for the n cameras. The process of finding matching pixel, determining candidate reconstruction points through the triangulation or the like as described above are the common processes in the art and thus the details thereof are omitted here.

If the distances among these (n−1) candidate reconstruction points are relatively short, for example, within a predetermined range, it can be considered that the (n−1) candidate reconstruction points as determined are correct and point to the same 3D reconstruction point in the space. In this case, the image processing device 710 can construct the 3D reconstruction point corresponding to pixel P based on the (n−1) candidate reconstruction points by employing various common processing methods in the art, such as least square method. The size of predetermined range represents a tolerance degree to the matching error and can be set depending on particular demands.

By contrast, if the (n−1) candidate reconstruction points conflict with each other, that is, if the distances among these (n−1) candidate reconstruction points are too long, for example, go beyond the predetermined range, the (n−1) candidate reconstruction points as determined are considered to be affected by the specular highlight and are not correct, and thus the correct 3D reconstruction point can not be constructed. In this case, the image processing device 710 will not use the (n−1) candidate reconstruction points to construct the 3D reconstruction point corresponding to pixel P, but discards them instead.

The system for 3D reconstruction according to the present embodiment has been described above. In this system, the regions in the image affected by the specular highlight can be identified effectively by controlling the brightness change of the light sources and the time for starting exposure of the cameras, thereby false 3D points caused by the pixel matching offset due to the interference of the specular highlight can be excluded and errors in the 3D reconstruction can be reduced effectively.

The main principles of the present disclosure have been described above with reference to the drawings. However, it is to be noted that the advantage, predominance, effect and so on are merely exemplary but not limited, and should not be interpreted to be necessary for the embodiments of the present disclosure. In addition, the specific details are disclosed only for the purpose of illustration and convenience of understanding but not for limitation. These details will not restrict the present disclosure to be implemented by employing these details necessarily.

The block diagrams of the devices, means, apparatus and system involved in the present disclosure are only illustrative examples and not intended to require or imply that they should be connected, arranged or configured in the manner shown in the diagrams. As will be realized by those skilled in the art, these devices, means, apparatus and system can be connected, arranged or configured in any way. The terms such as "including", "comprising", "having" or the like are open-meaning words, refer to "including but not limited to", and can be exchanged therewith. The terms of "or" and "and" used herein refer to "and/or" and can be exchanged therewith unless the context explicitly indicates not. The terms of "such as" used herein refer to "such as but not limited to" and can be exchanged therewith.

In addition, as used herein, the word of "or" used in the list of items beginning with "at least of one" indicates separate listing so that the list of "at least one of A, B or C" means A or B or C, AB or AC or BC, or ABC (that is, A and B and C). In addition, the term of "exemplary" does not indicate that the example in question is preferable or better than other examples.

It is also to be noted that in the device and method of the present disclosure, the parts or the steps can be divided and/or re-combined. The division and/or recombination should be considered as equivalent solutions of the present disclosure.

Various change, replacement or alternation to the present disclosure can be made without departing from the techniques defined in the claims. In addition, the scope of the claims of the present disclosure is not limited to the specific aspects of process, machine, manufacturing, composition of event, measure, method and action as described above. The process, machine, manufacturing, composition of event, measure, method and action which are currently existing or to be developed in the future and can perform substantially the same function or achieve substantially the same effect as the corresponding aspect as described here can be employed. Therefore, such process, machine, manufacturing, composition of event, measure, method and action are within the scope of the appended claims.

The above description of the aspects of the present disclosure is provided to enable those skilled in the art to make or use the present disclosure. Various modifications to these aspects are obvious to those skilled in the art and the general principles defined here can be applied to other aspects without departing from the scope of the present disclosure. Therefore, the present disclosure is not intended to be restricted to the aspects disclosed here and should accord to the broadest scope consistent with the principles and novel features disclosed here.

The above description is given in the purpose of illustration and explanation. In addition, the description is not intended to restrict the embodiments of the present disclosure to the form disclosed here. Although a plurality of exemplary aspects and embodiments have been discussed, those skilled in the art can conceive of other alternation, modification, change, addition and sub-combination thereof.

What is claimed is:

1. A method for obtaining images for three dimension (3D) reconstruction, comprising:
controlling brightness of each of at least two light sources which are spatially separated from each other to be changed periodically, including:
among the at least two light sources, there is at least one light source having a period of brightness change different from those of the other light source(s), or
the periods of the brightness change of the at least two light sources are the same, but among the at least two light sources, there is at least one light source having a phase of the brightness change different from those of the other light source(s); and
using at least three cameras having different spatial positions to capture the images of an object for the 3D reconstruction, respectively, wherein, among the at least three cameras, there is at least one camera starting exposure at a different time from the other cameras, the captured images being utilized to obtain a 3D stereo image of the object,
wherein the exposure time of the at least three cameras is comparable to the periods of the brightness change of the at least two light sources, and
wherein the exposure time of the at least three cameras is greater than a half of the largest period among the periods of the brightness change of the at least two light sources and less than twice of the smallest period among the periods of the brightness change of the at least two light sources, wherein the half of the largest period among the periods of the brightness change of the at least two light sources is less than twice of the smallest period among the periods of the brightness change of the at least two light sources.

2. The method according to claim 1, wherein when capturing images, each of the at least three cameras captures only one image.

3. The method according to claim 1, wherein the camera starting exposure at a different time from the other cameras starts exposure at a predetermined delay time after the other cameras start exposure.

4. The method according to claim 3, wherein the predetermined delay time is less than the largest period among the periods of the brightness change of the at least two light sources.

5. A method for three dimension (3D) reconstruction comprising:
controlling brightness of each of at least two light sources which are spatially separated from each other to be changed periodically, including:
among the at least two light sources, there is at least one light source having a period of brightness change different from those of the other light source(s), or
the periods of the brightness change of the at least two light sources are the same, but among the at least two light sources, there is at least one light source having a phase of the brightness change different from those of the other light source(s);
using at least three cameras having different spatial positions to capture the images of an object for the 3D reconstruction, respectively, wherein, among the at least three cameras, there is at least one camera starting exposure at a different time from other cameras;
using an image captured by any of the cameras as a reference image, and with respect to any pixel in the reference image, determining a candidate reconstruction point by using the pixel and a matching pixel in each of images captured by every other cameras, respectively;
constructing a 3D reconstruction point based on respective candidate reconstruction points if the respective candidate reconstruction points are within a predetermined range, otherwise not constructing the reconstruction point; and
obtaining a 3D stereo image of the object based on the constructed 3D reconstruction points,
wherein the exposure time of the at least three cameras is comparable to the periods of the brightness change of the at least two light sources, and
wherein the exposure time of the at least three cameras is greater than a half of the largest period among the periods of the brightness change of the at least two light sources and less than twice of the smallest period among the periods of the brightness change of the at least two light sources, wherein the half of the largest period among the periods of the brightness change of the at least two light sources is less than twice of the smallest period among the periods of the brightness change of the at least two light sources.

6. A system for obtaining images for three dimension (3D) reconstruction comprising:
at least two light sources spatially separated from each other, wherein the brightness of each of the light sources changes periodically; and
at least three cameras having different spatial positions, for capturing the images of an object for the 3D reconstruction, respectively, the captured images being utilized to obtain a 3D stereo image of the object,
the brightness of each of at least two light sources are controlled such that:
among the at least two light sources, there is at least one light source having a period of brightness change different from those of the other light source(s), or the periods of the brightness change of the at least two light sources are the same, but among the at least two light sources, there is at least one light source having a phase of the brightness change different from those of the other light source(s), and wherein, among the at least three cameras, there is at least one camera starting exposure at a different time from the other cameras, wherein the exposure time of the at least three cameras is comparable to the periods of the brightness change of the at least two light sources, and wherein the exposure time of the at least three cameras is greater than a half of the largest period among the periods of the brightness change of the at least two light sources and less than twice of the smallest period among the periods of the brightness change of the at least two light sources, wherein half of the largest period among the periods of the brightness change of the at least two light sources is less than twice of the smallest period among the periods of the brightness change of the at least two light sources.

7. The system according to claim 6, wherein when capturing images, each of the at least three cameras captures only one image.

8. The system according to claim 6, wherein the camera starting exposure at a different time from the other cameras starts exposure at a predetermined delay time after the other cameras start exposure.

9. The system according to claim 8, wherein the predetermined delay time is less than the largest period among the periods of the brightness change of the at least two light sources.

10. A system for three dimension (3D) reconstruction comprising:

at least two light sources spatially separated from each other, wherein brightness of each of the light sources is changed periodically;

at least three cameras having different spatial positions, for capturing the images of an object for the 3D reconstruction, respectively; and an image processing device, configured to use an image captured by any of the cameras as a reference image, and with respect to any pixel in the reference image, determine a candidate reconstruction point by using the pixel and a matching pixel in each of images captured by every other cameras, respectively, and construct a 3D reconstruction point based on respective candidate reconstruction points if the respective candidate reconstruction points are within a predetermined range, otherwise not construct the reconstruction point, and obtain a 3D stereo image of the object based on the constructed 3D reconstruction points, the brightness of each of at least two light sources are controlled such that:

among the at least two light sources, there is at least one light source having a period of brightness change different from those of the other light source(s), or the periods of the brightness change of the at least two light sources are the same, but among the at least two light sources, there is at least one light source having a phase of the brightness change different from those of the other light source(s), and wherein, among the at least three cameras, there is at least one camera starting exposure at a different time from the other cameras, wherein the exposure time of the at least three cameras is comparable to the periods of the brightness change of the at least two light sources, and wherein the exposure time of the at least three cameras is greater than a half of the largest period among the periods of the brightness change of the at least two light sources and less than twice of the smallest period among the periods of the brightness change of the at least two light sources, wherein half of the largest period among the periods of the brightness change of the at least two light sources is less than twice of the smallest period among the periods of the brightness change of the at least two light sources.

* * * * *